United States Patent Office 3,094,426
Patented June 18, 1963

3,094,426
BUILDING MATERIAL AND MANUFACTURE
THEREOF
Robert Del Mar, 329 Amherst NE., Albuquerque, N. Mex.
No Drawing. Filed Jan. 25, 1960, Ser. No. 4,204
6 Claims. (Cl. 106—109)

This invention relates to building materials and the manufacture thereof, and more particularly to gypsum-like moldable compositions for covering existing structures and to a process for their manufacture.

The building industry consumes large quantities of gypsum in the form of plaster of Paris, which is calcined gypsum, for gypsum lathe, wallboard, molds and casts of all kinds. The gypsum used for such products must be a relatively pure product, and must be calcined before it is usable to form aqueous mixtures which may be shaped to subsequently form hardened molded parts. Gypsum is a fairly common mineral widely distributed in sedimentary rocks, etc., and often as relatively thick beds. Gypsum is most commonly associated with many different minerals, the more common ones being halite, anhydrite, dolomite, etc. The minerals normally associated with the gypsum are interspersed through gypsum beds and are impurities in the mined mineral which are detrimental for the production of usable plaster of Paris. Commonly, such gypsum is at least partially purified before it is usable for building materials.

According to the present invention, I provide products of uncalcined, relatively impure calcium sulfate, which may be prepared from naturally occurring calcium sulfate such as gypsum and anhydrite, with minor portions of impurities in the form of silica, limestone, clay and the like, and in amounts up to 15 percent or more. The impure calcium sulfate mineral, or a mixture of such mineral, is finely ground and treated with a dilute solution of hydrofluosilicic acid ($H_2SiF_6$). The acid is added to the ground mineral in an amount sufficient to form at least a thick paste so as to wet the particles permitting a reaction of the acid therewith. Preferably the amount of acid is in the range of about one-fifth to two-thirds by weight of the solids. The mixture is thoroughly stirred during the relatively short period of time of the reaction, and it is then poured into molds or otherwise shaped for hardening. Various additives may be introduced into the mix for producing various changes in the resultant hardened product. Mineral wool may be dissolved in the acid prior to the reaction with the ore providing a finished product which is more dense and is relatively harder and stronger. The tensile strength of the finished product may be increased by the addition of asbestos fiber in amounts of ten to twenty percent by weight of dry ingredients.

Included among the objects and advantages of the present invention is the provision of gypsum-like products produced from uncalcined, relatively impure calcium sulfate materials. The invention includes the process of treating finely divided uncalcined calcium sulfate materials with dilute solutions of hydrofluosilicic acid for forming a resultant product for pouring into molds, which product hardens into a usable building material. The material of the invention in unhardened form has very good adhesive and cohesive properties for use as a building material and it may be sprayed, trowel molded, cast or otherwise formed into desired shapes. Further, the product of the invention may be modified with fillers and additives for modifying the hardened material. The production provides an inexpensive process for utilizing impure, essentially unbeneficiated ore to form usable gypsum-like products.

These and other objects and advantages of the invention may be readily ascertained by referring to the following description which is intended as illustrative of the processes and the products resulting therefrom.

In carrying out the process of the invention, dry, impure gypsum or anhydrite or mixtures of the two in varying proportions is ground to finely divided sizes in the range of 50–300 mesh, preferably about 300 mesh or finer. Impurities found with the natural ore are in the nature of silica or limestone or clay, and amounts up to approximately 15 percent by weight do not materially affect the final product. For commercial gypsum, anhydrite is an impurity and it must be reduced to a small percentage to make a usable gypsum. The effect of certain clays as impurities is somewhat variable. The clays which are high in organic content and those which contain appreciable quantities of magnesium, calcium, sodium or iron may tend to cause certain parts of the final product to be somewhat water soluble, or cause partial decomposition by immersion in water. Clays of the kaolinite group (essentially $Al_2Si_2O_5(OH)_4$) apparently do not cause water solubility of the final product. The gypsum or anhydrite may be used alone or the two may be mixed. It is preferable to use as much anhydrite as possible, and anhydrite alone produces an excellent product.

By using various fillers, variation in the characteristics of the final product may be achieved. Small amounts of mineral wool may be used to provide a product which produces a dense, hard molded material. The mineral or rock wool useful for the process is basically a silica plus varying amounts of oxides of calcium and magnesium with minor amounts of impurities. Such mineral wools are common commercial products and are readily available.

The finely divided calcium sulfate materials are treated with dilute solutions of hydrofluosilicic acid, and the amount of solution useful for the process may be in the range from about one-fifth to about two-thirds of weight of the solids. The amount of free acid in the water may be from one to five percent by volume.

*Example 1*

About 434 grams of dry anhydrite were ground to about 300 mesh, and the ground mineral plus 20 grams of mineral wool were added to about 200 ml. solution of about one percent hydrofluosilicic acid. Initially, the aqueous solution of acid was placed in a suitable container, for example a plastic or stainless steel container is normally preferred; however, an ordinary steel container will suffice. The mineral wool and the anhydrite were then added to the acid solution and a high speed mixer was used to stir the mixture for approximately twenty minutes. The reaction between the mineral and the acid creates a gas, and the mixing is continued until the gas evolved from the initial reaction is virtually stopped. Following the completion of the reaction, the mix is poured into a mold, or otherwise shaped, for hardening.

*Example 2*

Following the procedure of Example 1, about 454 grams of finely divided anhydrite was reacted with about 140 ml. of one percent hydrofluosilicic acid. The mixture was agitated for about twenty minutes, after which the product was poured into a mold for hardening.

*Example 3*

About 454 grams of gypsum ground to about 300 mesh was reacted with 180 ml. of about one percent hydrofluosilicic acid. The mixture was agitated for about thirty minutes, after which the mix was poured into a mold for hardening.

*Example 4*

An ore containing about 12 percent by weight of limestone ($CaCO_3$) and the remainder anhydrite was ground to about 300 mesh. About 454 grams of this ground mixture was reacted with 170 ml. of two percent hydrofluosilicic acid. The slurry was agitated for twenty-five minutes to complete the reaction of the acid with the ore, after which the resultant product was poured into a mold for hardening.

*Example 5*

About equal quantities of anhydrite and gypsum were ground to about 300 mesh. A mix of about 227 grams of anhydrite and about 227 grams of gypsum was reacted with 160 ml. of two percent hydrofluosilicic acid. The resultant slurry was mixed for about twenty-five minutes, after which the reacted product was poured into a mold for hardening.

The products of the above examples all provided a finished material which was comparable in physical properties to commercially produced gypsum products. The products are excellent fillers for gypsum-type wallboard, i.e., hardened gypsum sheet sandwiched between two heavy paper layers.

The process of the invention produces excellent gypsum-like products and eliminates the norml purification of gypsum and the calcining of such purified minerals. The process may be readily used in the field to form a gypsum-like mud which may be sprayed on a surface, troweled into shape, or poured and pressed into the desired shape.

While the invention has been illustrated by reference to specific examples, it is not intended to limit the spirit or scope thereto, except as defined in the appended claims.

I claim:

1. A process for producing gypsum-like products from uncalcined, naturally occurring, relatively impure calcium sulfate, which consists of reducing such a sulfate to finely divided sizes, forming a high density slurry of the resultant finely divided sulfate with a 1–5% solution of hydrofluosilicic acid, maintaining said sulfate in intimate contact with said acid until completion of gas evolution, and then placing the resultant product into molds for hardening into a desired shape.

2. A process for producing gypsum-like products from uncalcined, naturally occurring, relatively impure gypsum which consists of reducing a major portion of such gypsum to sizes of about 300 mesh, treating the resultant finely divided product with from ⅕ to ⅔ by weight of a 1–5% solution of hydrofluosilicic acid, maintaining said gypsum in intimate contact with said acid until completion of gas evolution, and then placing the resultant product into molds for hardening into desired shapes.

3. A process for producing gypsum-like products from uncalcined, relatively impure calcium sulfate material which comprises reducing a major portion of such material to about 300 mesh, treating the resultant finely divided material with a solution which is from ⅕ to ⅔ by weight of the material, said solution being dilute hydrofluosilicic acid and a minor amount of dissolved mineral wool, said solution containing from 1–5% by volume of free acid, stirring the resultant mixture until evolution of gas therefrom ceases, and then placing the resultant mixture into molds for hardening into desired shapes.

4. A process according to claim 3 wherein the impure calcium sulfate is gypsum.

5. A process according to claim 3 wherein the impure calcium sulfate is anhydrite.

6. A process according to claim 3 wherein the impure calcium sulfate is mixed and blended gypsum and anhydrite.

References Cited in the file of this patent

UNITED STATES PATENTS

| | | |
|---|---|---|
| 2,002,945 | Hoggatt | May 28, 1935 |
| 2,606,126 | Weber | Aug. 5, 1952 |
| 2,606,127 | Weber | Aug. 5, 1952 |
| 2,606,129 | Weber | Aug. 5, 1952 |
| 2,608,491 | Weber | Aug. 26, 1952 |
| 2,733,996 | Hagersten | Feb. 7, 1956 |